(12) United States Patent
Bozikis et al.

(10) Patent No.: US 8,336,212 B2
(45) Date of Patent: Dec. 25, 2012

(54) RAZOR BLADE UNIT

(75) Inventors: Ioannis Bozikis, Koukaki Athens (GR);
Dimitris Efthimiadis, Athens (GR);
Spiros Gratsias, Kypseli-Athènes (GR)

(73) Assignee: Bic-Violex SA, Agiou Athanasiou, Anixi, Attiki (GR)

( * ) Notice: Subject to any disclaimer, the term of this patent is extended or adjusted under 35 U.S.C. 154(b) by 573 days.

(21) Appl. No.: 12/305,826

(22) PCT Filed: Jun. 20, 2006

(86) PCT No.: PCT/EP2006/005905
§ 371 (c)(1),
(2), (4) Date: Feb. 17, 2009

(87) PCT Pub. No.: WO2007/147420
PCT Pub. Date: Dec. 27, 2007

(65) Prior Publication Data
US 2010/0175265 A1    Jul. 15, 2010

(51) Int. Cl.
*B26B 21/00*    (2006.01)
(52) U.S. Cl. .......................................... 30/50
(58) Field of Classification Search ............. 30/41, 41.5, 30/50, 57
See application file for complete search history.

(56) References Cited

U.S. PATENT DOCUMENTS

| | | | |
|---|---|---|---|
| 4,270,268 A | 6/1981 | Jacobson | |
| 4,378,634 A | 4/1983 | Jacobson | |
| 4,442,598 A | 4/1984 | Jacobson | |
| 4,488,357 A | 12/1984 | Jacobson | |
| 4,492,024 A | 1/1985 | Jacobson | |
| 4,587,729 A | 5/1986 | Jacobson | |
| 4,621,424 A | 11/1986 | Jacobson | |
| 4,932,122 A * | 6/1990 | Shurland et al. | 30/50 |
| 5,369,885 A * | 12/1994 | Ferraro | 30/50 |
| 5,416,974 A * | 5/1995 | Wain | 30/50 |
| 5,426,851 A | 6/1995 | Gilder et al. | |
| 6,009,624 A | 1/2000 | Apprille, Jr. et al. | |
| 6,035,537 A | 3/2000 | Apprille, Jr. et al. | |
| 6,044,542 A | 4/2000 | Apprille, Jr. et al. | |
| 6,212,777 B1 | 4/2001 | Gilder et al. | |
| 6,216,349 B1 | 4/2001 | Gilder et al. | |
| 6,276,062 B1 | 8/2001 | Prochaska | |
| 6,397,473 B1 * | 6/2002 | Clark | 30/50 |
| 6,601,303 B2 * | 8/2003 | Gilder et al. | 30/50 |
| 8,117,753 B2 * | 2/2012 | Gilder et al. | 30/50 |
| 2002/0144404 A1 | 10/2002 | Gilder et al. | |
| 2002/0157259 A1 | 10/2002 | Coffin | |
| 2003/0204955 A1 | 11/2003 | Gilder et al. | |
| 2003/0217469 A1 | 11/2003 | Coffin | |
| 2004/0060176 A1 | 4/2004 | Gilder et al. | |
| 2004/0221455 A1 | 11/2004 | Coffin | |
| 2005/0015991 A1 | 1/2005 | Follo et al. | |
| 2005/0108882 A1 | 5/2005 | Gilder et al. | |

(Continued)

FOREIGN PATENT DOCUMENTS

| | | |
|---|---|---|
| CA | 1 155 643 | 7/1981 |
| EP | 0 760 734 B1 | 1/2001 |

(Continued)

*Primary Examiner* — Jason Daniel Prone
(74) *Attorney, Agent, or Firm* — Jones Day

(57) ABSTRACT

A razor blade unit having a frame and blades movably mounted in the frame, each blade being elastically biased toward a rest position where the upper face of each blade bears against upper stop portions of the frame, the upper face of each blade being parallel to the corresponding upper stop portions.

20 Claims, 11 Drawing Sheets

U.S. PATENT DOCUMENTS

| | | | |
|---|---|---|---|
| 2005/0172489 A1* | 8/2005 | Aviza | 30/32 |
| 2006/0101647 A1* | 5/2006 | Gilder et al. | 30/50 |
| 2009/0126196 A1* | 5/2009 | Gilder et al. | 30/50 |
| 2010/0077619 A1* | 4/2010 | Follo et al. | 30/50 |
| 2010/0229398 A1* | 9/2010 | Coffin | 30/50 |
| 2010/0269351 A1* | 10/2010 | Gilder et al. | 30/50 |
| 2011/0289779 A1* | 12/2011 | Volodin et al. | 30/50 |
| 2012/0011725 A1* | 1/2012 | Gratsias et al. | 30/50 |

FOREIGN PATENT DOCUMENTS

| | | |
|---|---|---|
| WO | WO 98/05478 | 2/1998 |
| WO | WO 2007147420 A1 * | 12/2007 |
| WO | WO 2010069388 A1 * | 6/2010 |

* cited by examiner

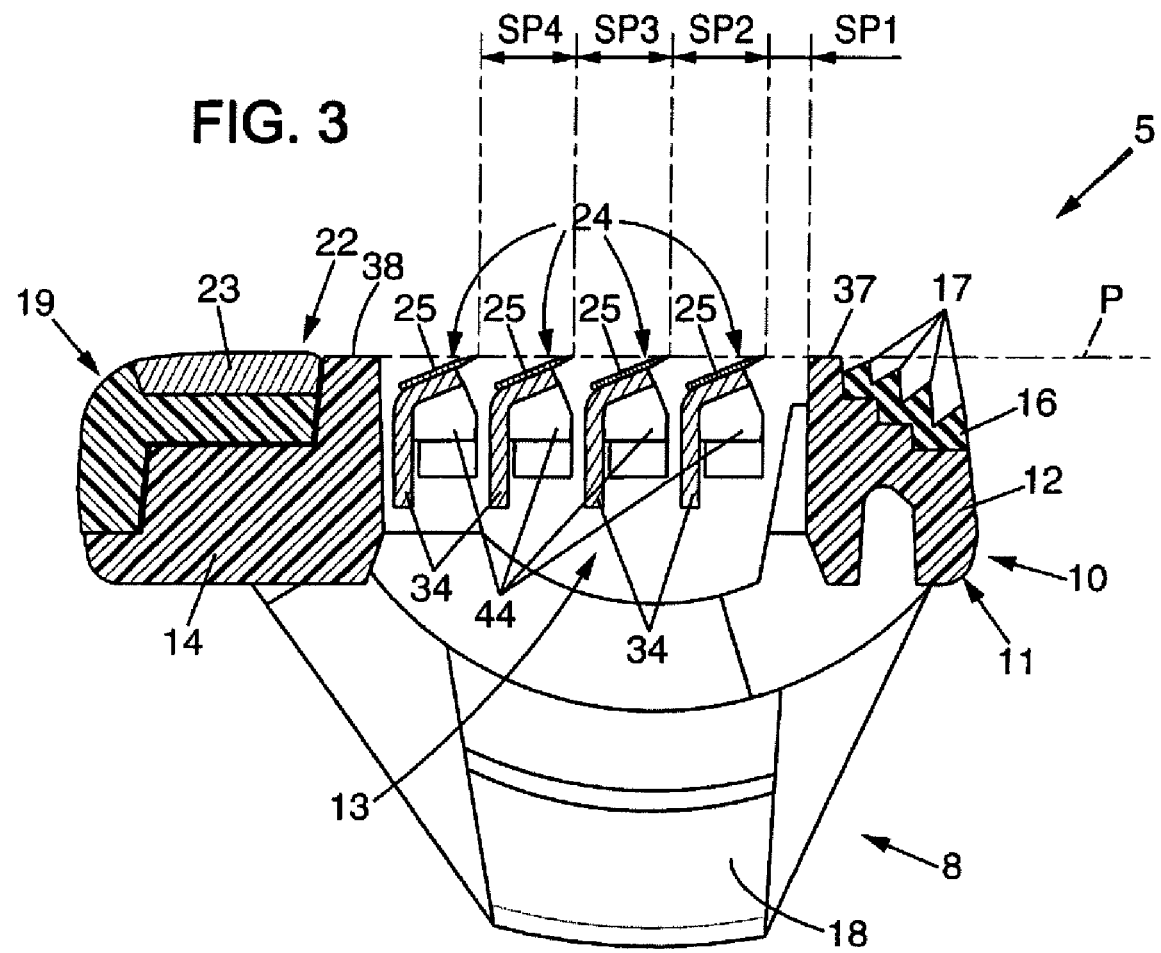

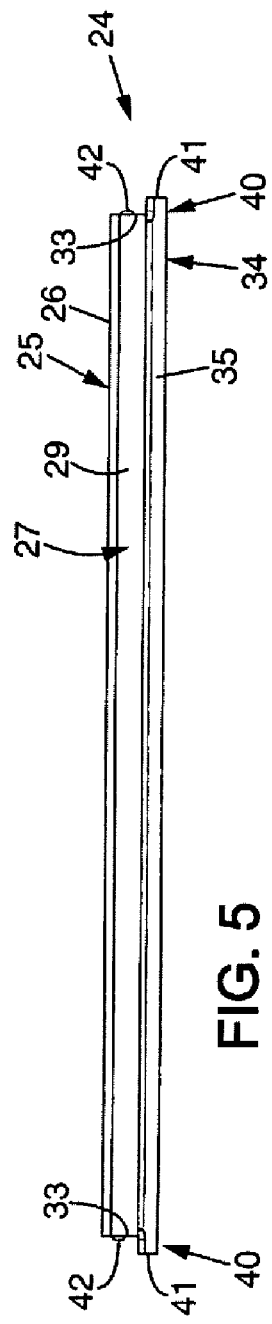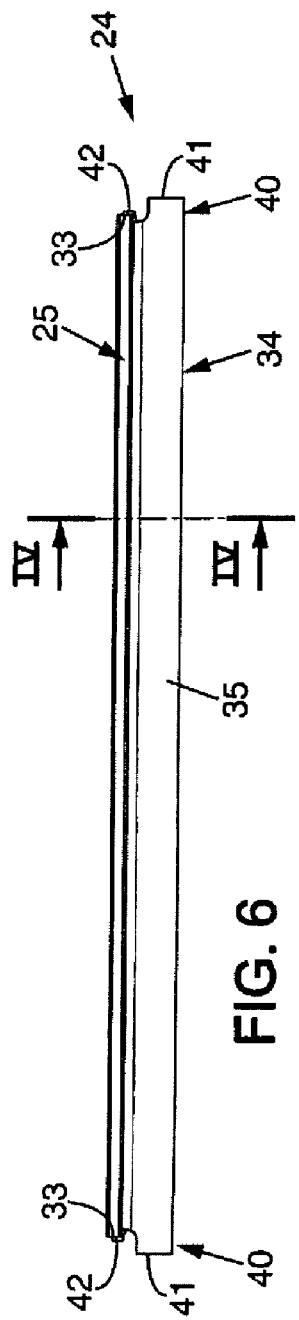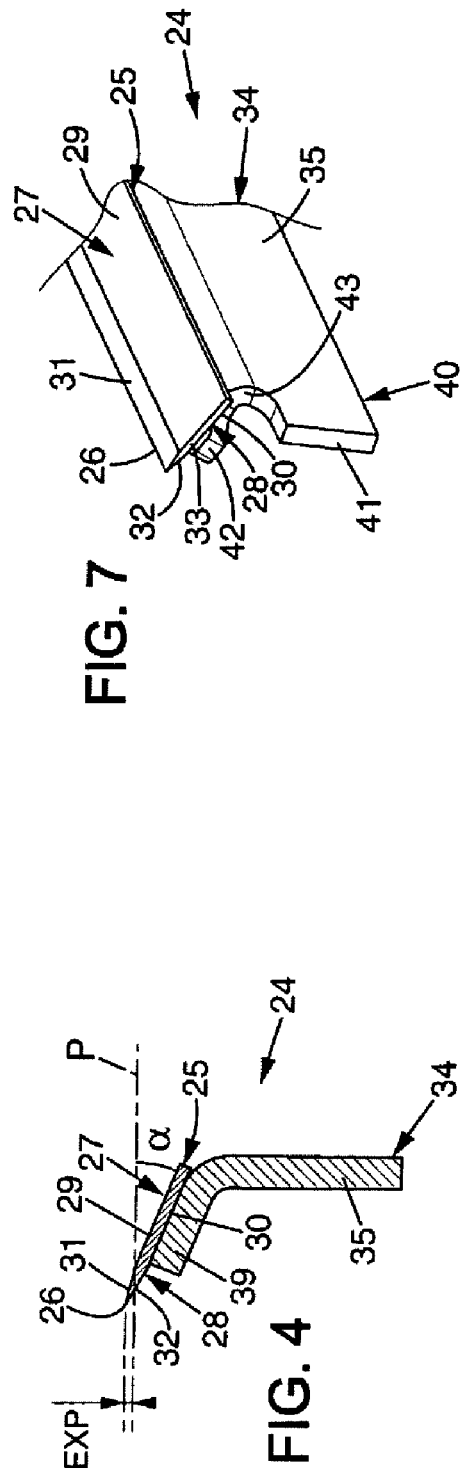

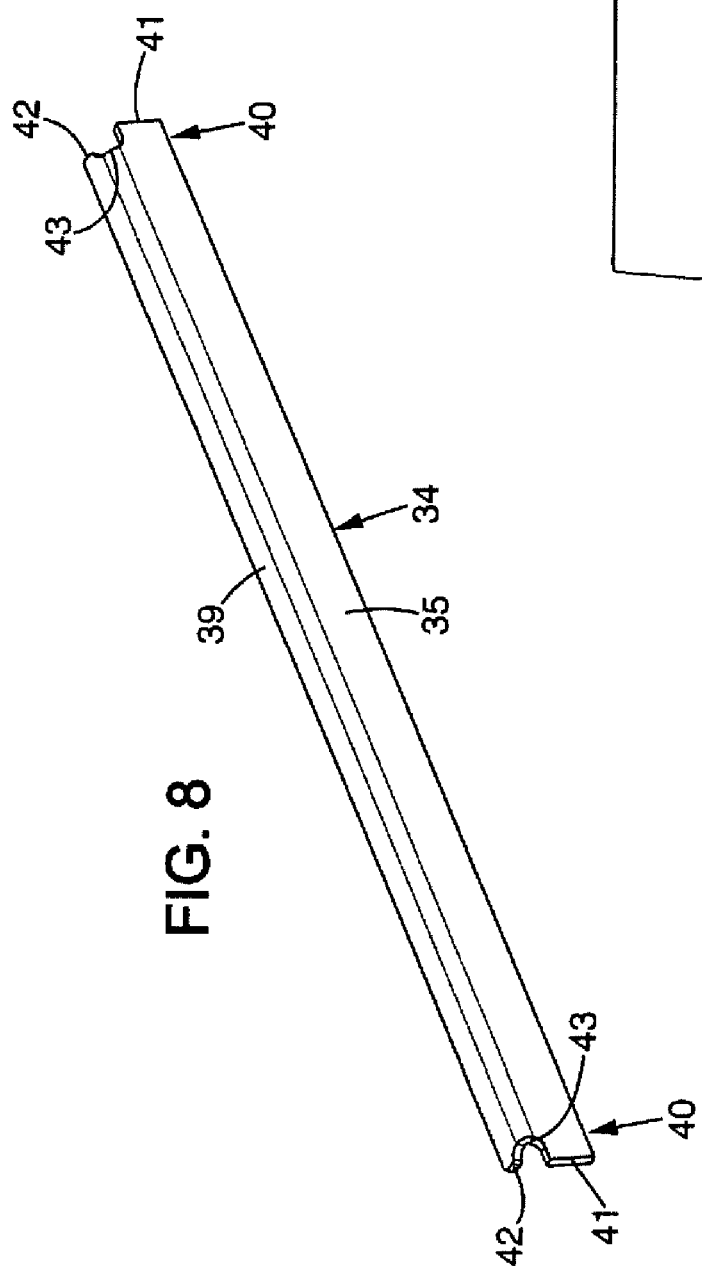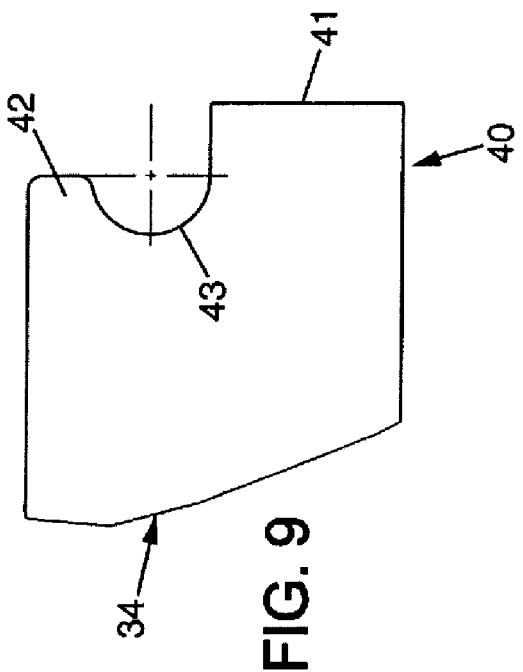

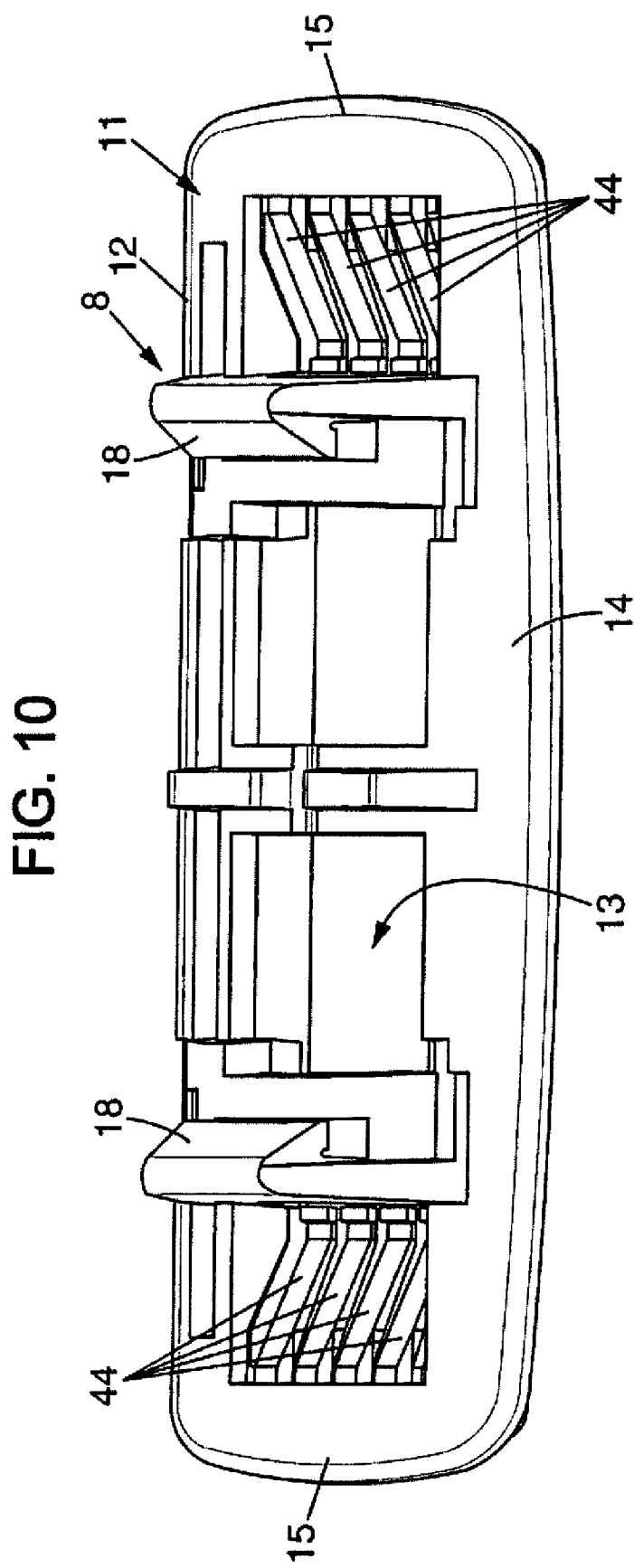

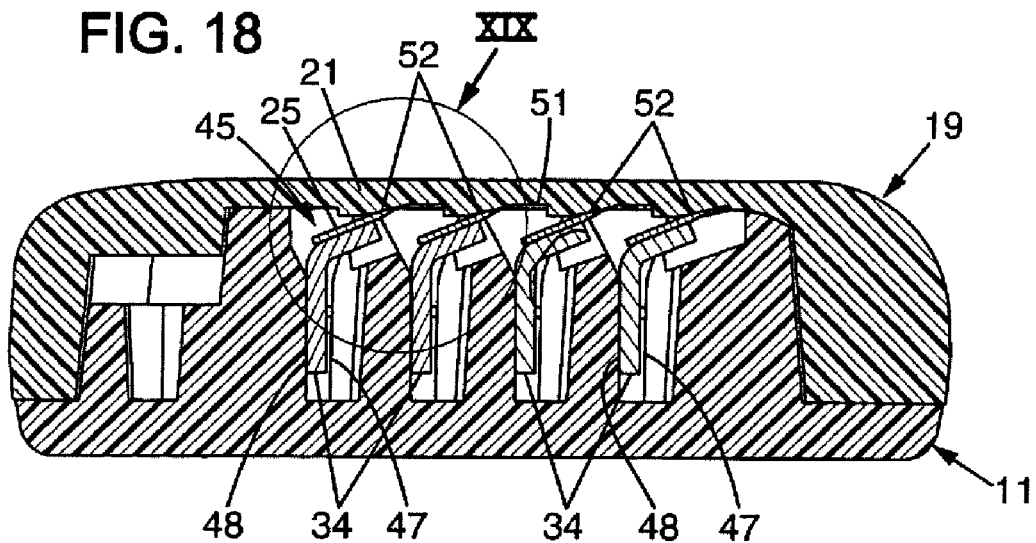
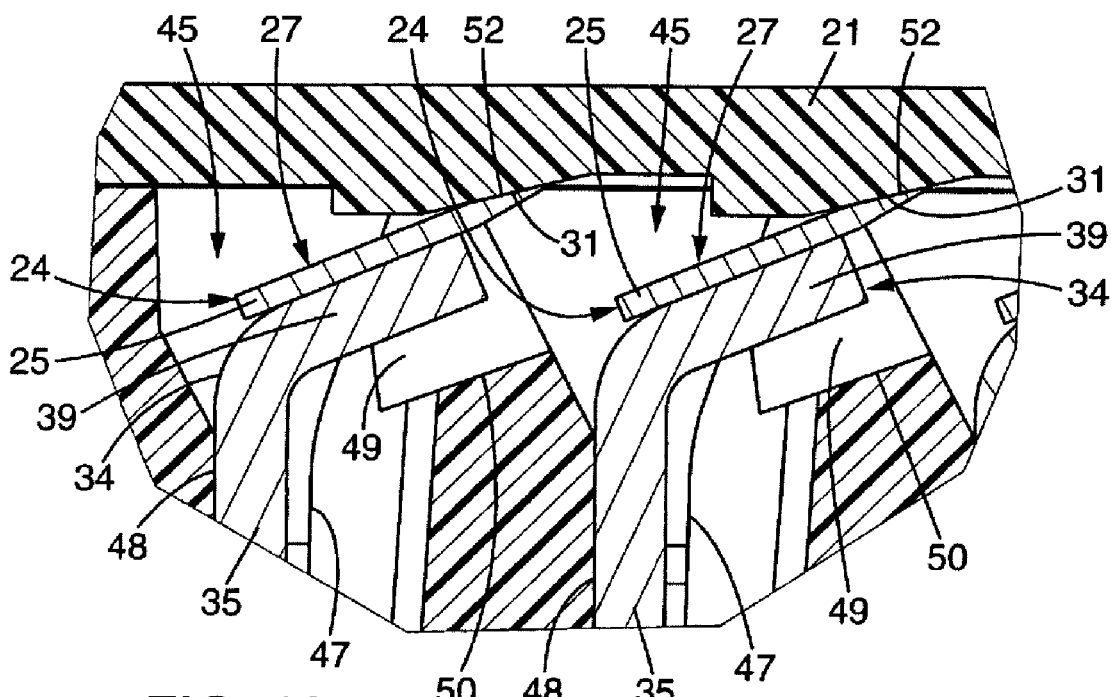

RAZOR BLADE UNIT

CROSS-REFERENCE TO RELATED APPLICATIONS

This application is a national stage application of International Application No. PCT/EP2006/005905, filed on Jun. 20, 2006, the entire contents of the application being incorporated herein by reference.

BACKGROUND OF THE INVENTION

1. Field of the Invention

The embodiments of the present invention relate to razor blade units and to safety razors including such blade units.

More precisely, the embodiments of the present invention relate to a razor blade unit including a frame and at least one blade movably mounted in said frame, said blade including an upper face, a lower face and a cutting edge, said frame including at least one upper stop portion and said blade being elastically biased toward said upper stop portion, where said blade is in a rest position.

2. Description of Related Art

US-A-2002/0144404 discloses an example of such a known razor blade unit, in which the cutting edges of the blades bear against the upper stops of the frame when the blades are in their position of maximum exposure.

Therefore, the cutting edges of the blades may penetrate in the upper stop portions (which are made of plastics in this case) and/or be damaged when the blades are in their rest position, so that the exposure of the blades at rest is not well defined. This, in turn, entails a lack of precision of the shaving.

SUMMARY OF THE INVENTION

One objective of the embodiments of the present invention is to avoid this drawback.

To this end, according to the embodiments of the invention, in a razor blade unit of the type in question, the upper face of said blade bears against the upper stop portion when the blade is in the rest position, said upper face being substantially parallel to the upper stop portion.

Based on these dispositions, the blade edge does not penetrate in the upper stop portion and is not damaged by the upper stop portion under the elastic bias undergone by the blade, so that the rest position of the blade is well defined and the safety razor blade unit enables a precise shaving.

In various embodiments of the invention, one may have recourse in addition to one and/or other of the following arrangements:

- the blade is movable under forces encountered during shaving and the rest position is a position of maximum exposure of the blade;
- the frame preferably includes at least one elastic finger elastically biasing the blade toward the rest position;
- the frame is preferably made of synthetic material;
- the frame is deprived of metal;
- the upper and lower faces of the blade include respectively two parallel main surfaces and two tapered facets which taper toward the cutting edge, the tapered facet of the upper face bearing against the upper stop portion in the rest position and said tapered facet of the upper face being substantially parallel to the upper stop portion;
- the frame preferably includes a guard, a cap and two side portions joining the guard to the cap, the blade extending parallel to the guard and the cap between two lateral ends which are respectively near said two side portions, said side portions including two upper stop portions against which the two lateral ends of the blade bear respectively in the rest position, the upper face of the blade being substantially parallel said two upper stop portions;
- the blade unit preferably includes several parallel blades and the side portions preferably include two upper stop portions for each blade, against which the two lateral ends of each blade bear respectively in the rest position, the upper face of each blade being substantially parallel to the corresponding upper stop portions;
- the blade is slidingly mounted in two slots which are provided respectively in the two side portions of the frame;
- the blade is borne by a bent support having a lower portion extending in a plane parallel to the slots and an upper portion extending in a plane parallel to the blade, the lower portion extending parallel to the cutting edge between two lateral portions which are slidingly mounted in the slots;
- each slot of the frame is defined between a front guide surface and a back guide surface belonging to the corresponding side portion of the frame, said front guide surface being closer to the guard and said back guide surface being closer to said cap, and said front and back guide surfaces being laterally offset with regard to one another parallel to the cutting edge of the blade;
- each lateral portion of the lower portion of the blade support has a side edge and the slot in which said side portion is slidingly mounted has its front guide surface closer to said side edge and its back guide surface further away from the side edge;
- each side portion of the frame further preferably includes a lower stop portion which is near the front guide surface and which is disposed under the upper portion of the bent support to limit sliding of the blade and bent support away from said rest position;
- the lower stop portion is preferably substantially parallel to the upper portion of the bent support;
- each lateral portion of the lower portion of the blade support preferably has a side edge and said lateral portions of the lower portion of the bent support are protruding laterally from the upper portion and from the blade, each lower stop portion being offset laterally from the front guide surface, away from the corresponding lateral edge of the lower portion of the blade support;
- the upper portion of the bent support extends parallel to the cutting edge between two lateral edges, and each side portion of the frame including two lateral guide surfaces respectively facing the lateral edges of the upper portion of the bent support;
- the blade extends parallel to the guard and the cap between two lateral ends, the lateral edge of the upper portion of the bent support having a rounded protrusion which protrudes laterally from the corresponding side edge of the blade, said rounded protrusion being in sliding engagement with the corresponding lateral guide surface (it should be noted that this feature could be used independently of the above dispositions);
- the bent support is preferably a cut out and bent sheet metal part including lateral wings which constitute said rounded protrusions, said lateral wings having rounded angles;
- each slot of the frame is defined between a front guide surface and a back guide surface belonging to the corresponding side portion of the frame, said front guide surface being closer to the guard and said back guide surface being closer to said cap, and said front and back guide surfaces being laterally offset with regard to one another parallel to the cutting edge of the blade, each side portion of the frame further preferably includes a lower stop portion which is near the front guide surface and which is disposed under the upper portion of the bent support to limit sliding of the blade and bent support away from said rest position, the blade unit preferably includes several parallel blades and each side portion of the frame preferably includes at least two slots separated by a partition including:

the front guide surface, the lower stop portion and the lateral guide surface of one of the slots, and the back guide surface of the other slot.

Besides, another object of the embodiments of the present invention is a safety razor including a handle and a razor blade unit as defined above, mounted on the handle.

BRIEF DESCRIPTION OF THE DRAWINGS

Other features and advantages of the invention appear from the following detailed description of one of its embodiments, given by way of non-limiting example, and with reference to the accompanying drawings.

In the drawings:

FIG. 3 is a cross section of the blade unit of FIG. 2, along line of FIG. 2, FIG. 4 is a detail cross section of one of the blade members of the blade unit of FIGS. 2 and 3, FIGS. 5 and 6 are respectively a top view and a rear view of the blade member of FIG. 4, FIG. 7 is a perspective view of one end of the blade member of FIGS. 4-6, FIG. 8 is a perspective view of the blade support belonging to the blade member of FIGS. 4-7, FIG. 9 is a detail plan view of one end of the blade support of FIG. 8, before bending thereof, FIGS. 10 and 11 are respectively perspective views from below and from the top of a platform member belonging to the blade unit of FIGS. 2 and 3, FIG. 18 is a cross section of the complete blade unit, taken along line XVIII-XVIII of FIG. 11, and FIG. 19 is an enlarged view of detail XIX of FIG. 19.

MORE DETAILED DESCRIPTION

In the figures, the same references denote identical or similar elements.

Figure 1:
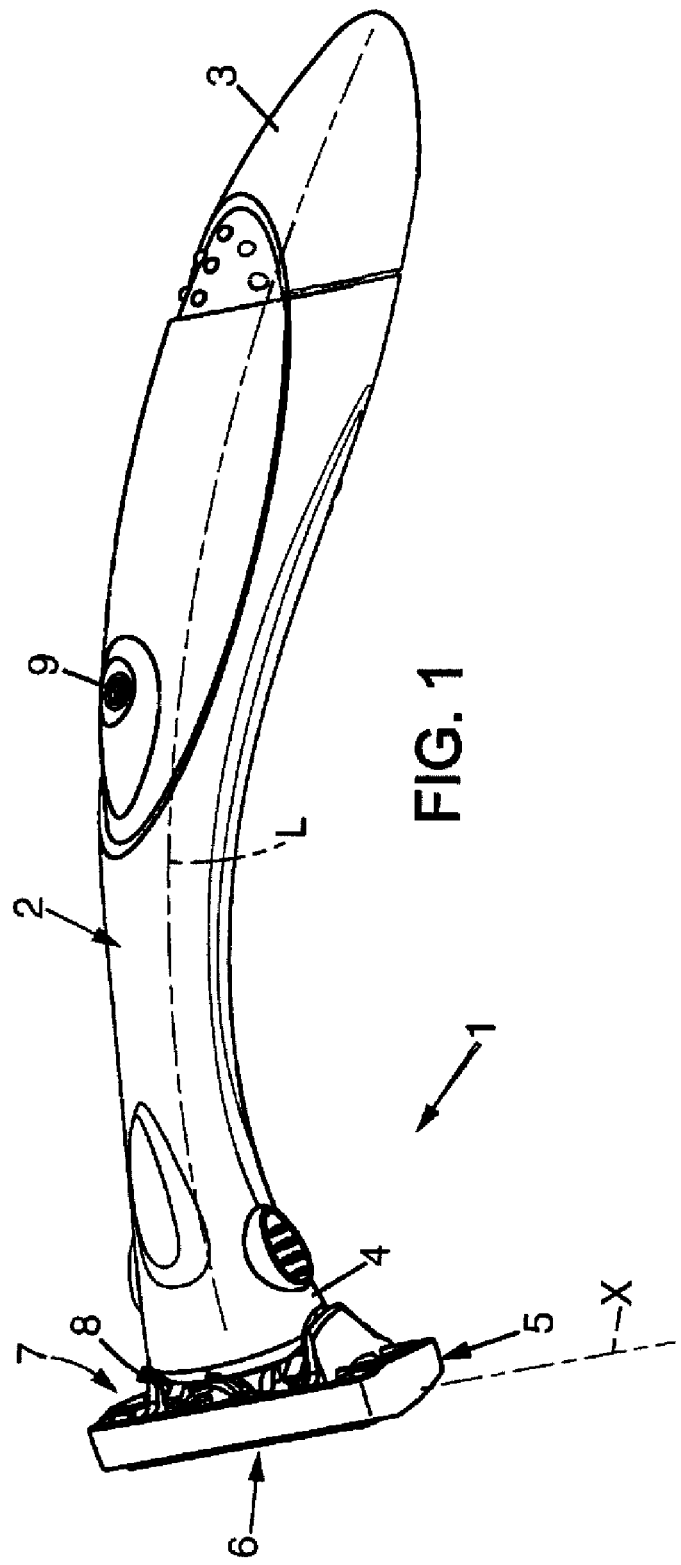
FIG. 1 is a perspective view of a safety razor according to one embodiment of the invention.

FIG. 1 shows a safety razor 1 (also called wet shaver), i.e. a shaver the blades of which are not driven by a motor relative to the blade unit.

The shaver 1 preferably includes a handle 2 extending in a longitudinal direction L between a proximal portion 3 and a distal portion 4 bearing a blade unit 5 or shaving head. The longitudinal direction L may be curved or include one or several straight portions.

The blade unit 5 preferably includes an upper face 6 equipped with one or several blades and a lower face 7 which is connected to the distal portion 4 of the handle 2 by a connection mechanism 8. The connection mechanism 8 may for instance enable the blade unit 5 to pivot relative to a pivot axis X which is substantially perpendicular to the longitudinal direction L. Said connection mechanism may further enable to selectively release the blade unit for the purpose of exchanging blade units. One particular example of connection mechanism usable in the present invention is described in document WO-A-2006/027018.

In the particular example shown in FIG. 1, the handle 2 may further include an internal vibrating mechanism (not shown), which may be for instance as described in the above mentioned document WO-A-2006/027018 and which is controlled by a user actuated switch 9.

Of course, the embodiments of the present invention are neither limited to such vibrating handle, nor to any particular connection mechanism connecting the blade unit 5 to the handle 2.

Figure 2:
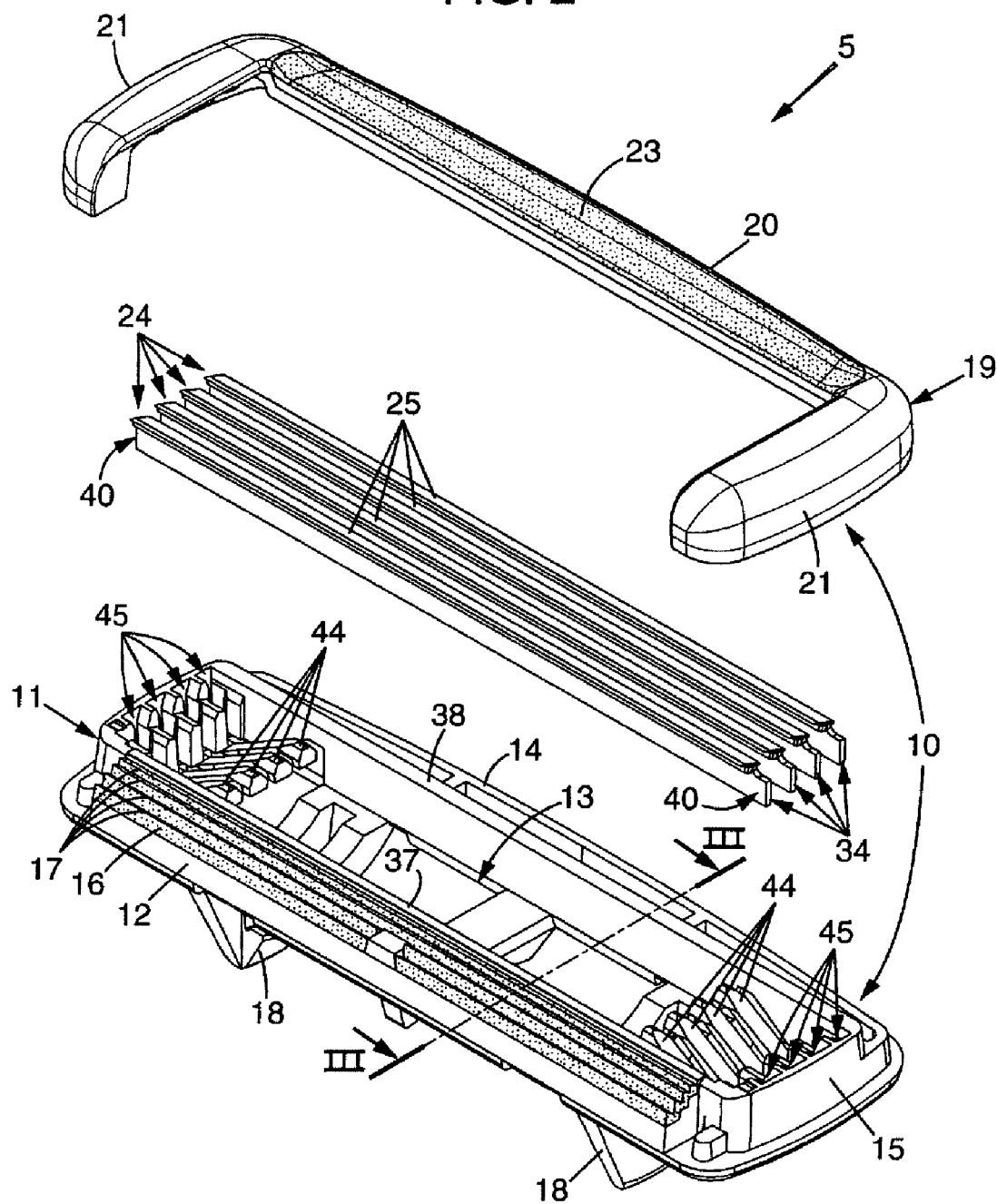
FIG. 2 is an exploded perspective view of the blade unit of the safety razor of FIG. 1.

As shown in FIGS. 2 and 3, the blade unit 5 preferably includes a frame 10 which is made solely of synthetic materials, i.e. plastic materials and elastomeric materials.

More precisely, the frame 10 preferably includes a plastic platform member 11 connected to the handle 2 by the connection mechanism 8 and having:

a guard 12 extending parallel to pivot axis X, a blade receiving section 13 situated rearward of the guard 12 in the direction of shaving, a cap portion 14 extending parallel to pivot axis X and situated rearward of the blade receiving section 13 in the direction of shaving, and two side portions 15 joining the longitudinal ends of the guard 12 and of the cap portion 14 together.

The upper surface of the rear portion 37 of the guard 12 and the upper surface of the front portion 38 of the cap portion 14 come into contact with the user's skin during shaving and define a reference plane P which is tangent to said upper surfaces of said rear portion 37 and front portion 38.

Figure 12:
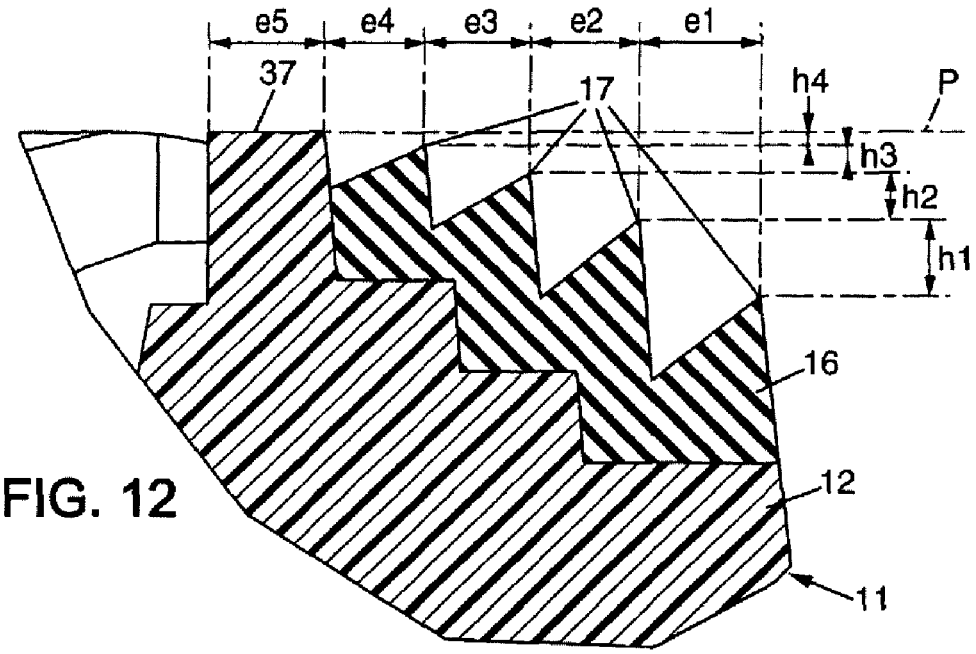
FIG. 12 is a detail cross section of the guard of the platform member of FIGS. 10 and 11.

In the example shown in the figures, the guard 12 is covered by an elastomeric layer 16 forming a plurality of fins 17 extending parallel to pivot axis X. As shown in more details in FIG. 12, the elastomeric layer 16 may include for instance four fins 17. The second fin 17 (in the direction of the shaving) may for instance have its apex situated at a height h1 around 0.34 mm above the apex of the first fin 17 (the height h1 being measured perpendicular to the reference plane P), whereas the apex of the third fin 17 is situated at a height h2 for instance around 0.20 mm above the apex of the second fin 17, the apex of the fourth fin 17 being situated at a height h3 around 0.12 mm above the apex of the third fin 17 and the rear portion 37 of the guard, being made as a single piece of plastic material with platform 11 being at a height h4 around 0.6 mm above the of plastic material of the fourth fin. Further, in the particular example shown in the drawings, the distance e1 between the apices of the first and second fins 17 is around 0.52 mm, the distance e2 between the apices of the second and third fins is around 0.48 mm, the distance e3 between the apices of the third and fourth fins is around 0.45 mm, the distance e4 between the apex of the fourth fin and the rear portion 37 of the guard is around 0.43 mm, and the width e5 of the rear portion 37 of the guard is around 0.5 mm (these distances e1-e5 are measured parallel to the reference plane P and perpendicular to pivot axis X).

Further, in this particular example, the underside of the platform member 11 preferably includes two shell bearings 18 which belong to the connection mechanism 8 and which may be for example as described in the above-mentioned document WO-A-2006/027018 (see FIGS. 2, 3 and 10).

The frame 10 further preferably includes a plastic cover 19 which exhibits a general U shape, with a cap portion 20 partially covering the cap portion 14 of the platform and two side members 21 covering the two side members 15 of the platform.

The cap portion 20 of the cover forms, with the cap portion 14 of the platform, a cap 22 with comes into contact with the skin of the user during shaving. The cap portion 20 of the cover 19 may include a lubricating strip 23 which is oriented upward and comes into contact with the skin of the user during shaving. This lubricating strip may be formed for instance by co-injection with the rest of the cover.

Besides, the side members 21 of the cover form, together with the side members 15 of the platform, two side portions of the frame, joining the guard 12 to the cap 22.

The cover 19 may be fixed to the platform 11 by any known means, for instance by ultrasound welding or by laser welding, for instance as described in document WO-A-2005/108024.

Besides, at least one blade member 24 is movably mounted in the blade receiving section 13 of the platform. The blade receiving section 13 may include several blade members 24, for instance four blade members as in the example shown in the drawings.

As shown in FIGS. 3-7, each blade member 24 preferably includes a blade 25 which is formed by a flat steel strip with a cutting edge 26 oriented forward in the direction of shaving. Each blade 25 has an upper face 27 oriented towards the skin to be shaved and a lower face 28 oriented toward the handle 2. The upper and lower faces 27, 28 of the blade include respectively two parallel main surfaces 29,30 and two tapered facets 31,32 which taper towards the cutting edge 26.

As shown in FIGS. 5-7, each blade 25 extends longitudinally, parallel to pivot axis X, between two lateral ends 33.

Each blade 25 is borne by a bent support 34 which is visible in more detail in FIGS. 7-9. The bent support 34 is a sheet metal part made out of steel with a bent profile including:
a substantially flat lower portion 35 (i.e. substantially perpendicular to reference plane P),
and a substantially flat upper portion 39 which extends parallel to the blade 25.

The blade 25 is fixed on the upper portion 39 of the bent support by any known means, for instance by laser spot welding.

The angle α of the upper portion 39 and of the blade 25 with regard to reference plane P may be around 22°.

As shown in FIGS. 5-9, the lower portion 35 of the bent support 34 extends longitudinally, parallel to pivot axis X, between two lateral portions 40. Each lateral portion 40 preferably includes a side edge 41.

Besides, the upper portion 39 of the bent support extends longitudinally between two lateral edges each including a rounded protrusion 42 which is constituted by a lateral wing with rounded angles protruding laterally from the upper portion 39 and from a corresponding lateral end 33 of the blade.

Further, a rounded indent 43 is cut out from the sheet metal forming the blade support, said indent separating the rounded protrusion 42 from the lateral edge 41 of the lower portion.

The side edges 41 of the lower portion of the bent support protrude laterally from the lateral ends 33 of the blade and from the rounded protrusions 42.

As shown in FIG. 9, the bent support may be made from a flat sheet metal part which is then bent before welding of the blade 25 on the upper portion 39 thereof.

As shown in FIGS. 2 and 3, each blade member 34 is borne by two elastic fingers 44 which are molded as a single piece with platform 11 and which extend towards each other and upwardly from both side members 15 of the platform.

Figure 11:
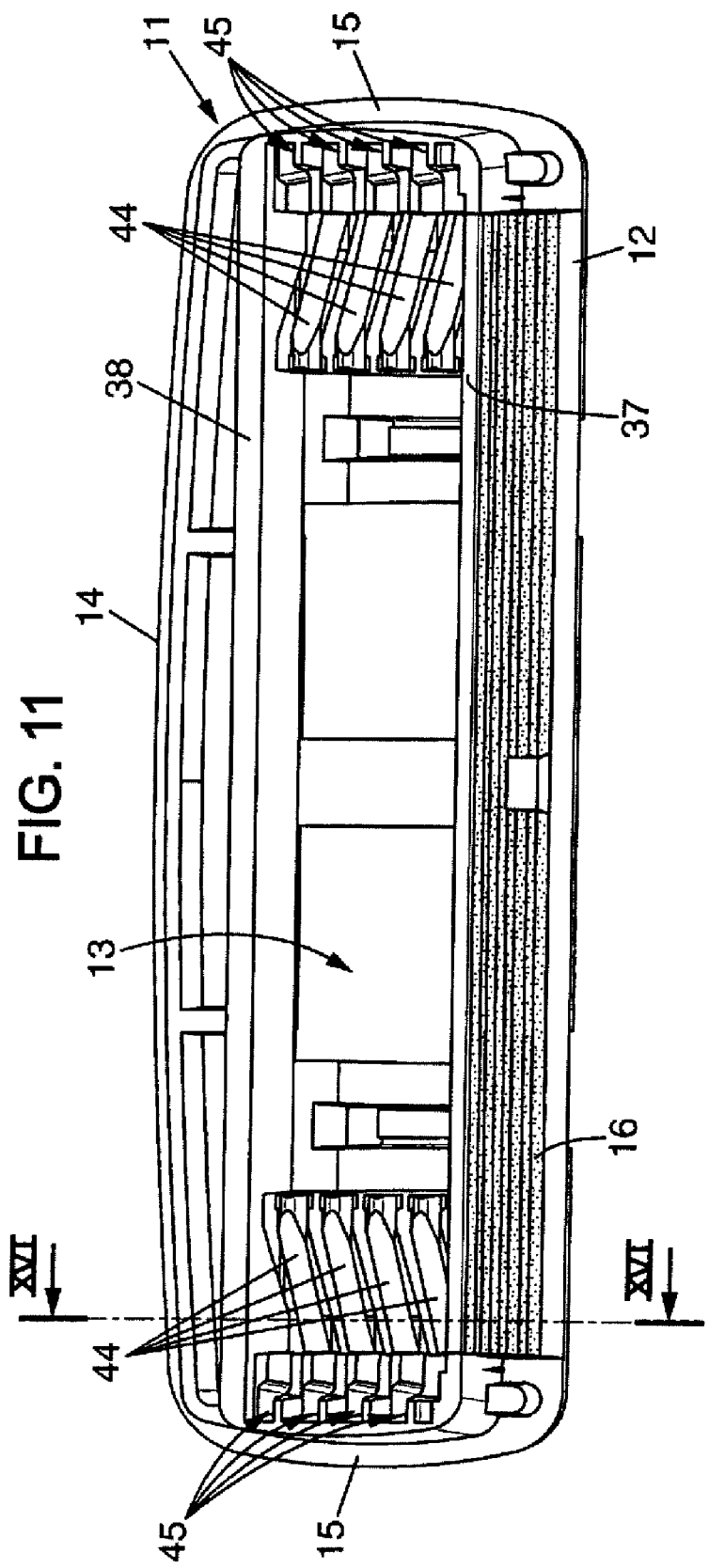
Figure 13:
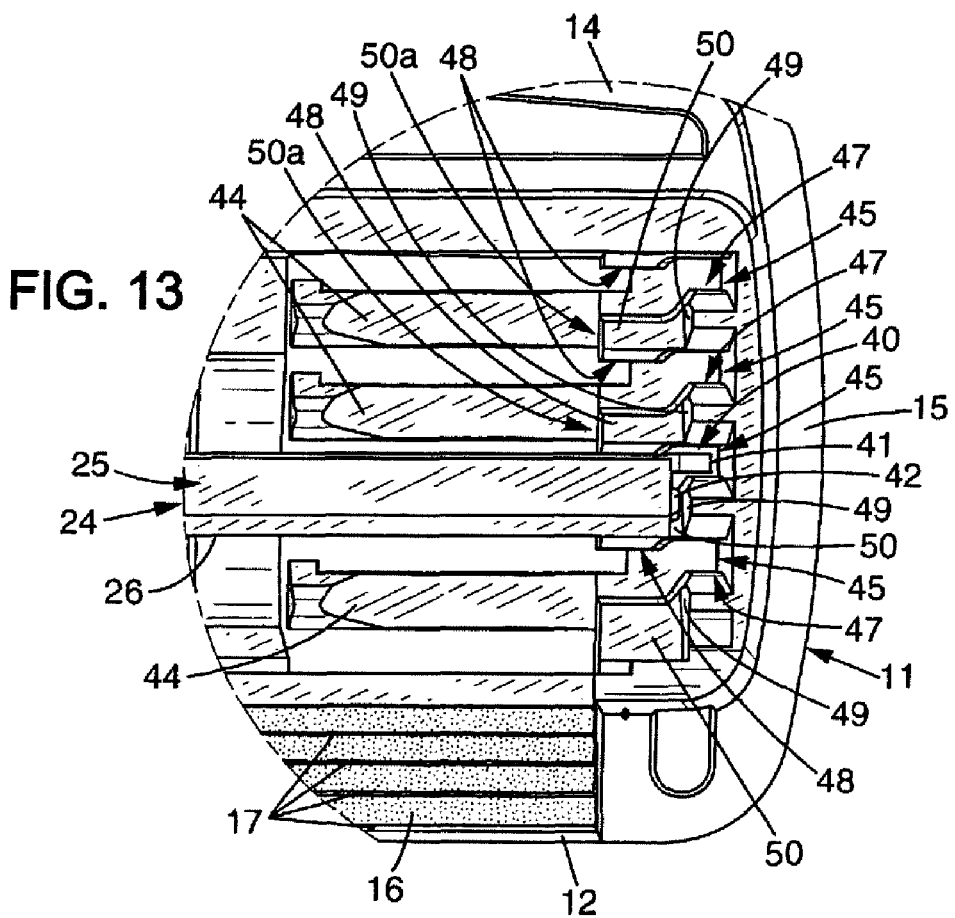
FIG. 13 is a detail plan view of the platform member of FIGS. 10 and 11, further showing one of the blade members mounted therein.
Figure 14:
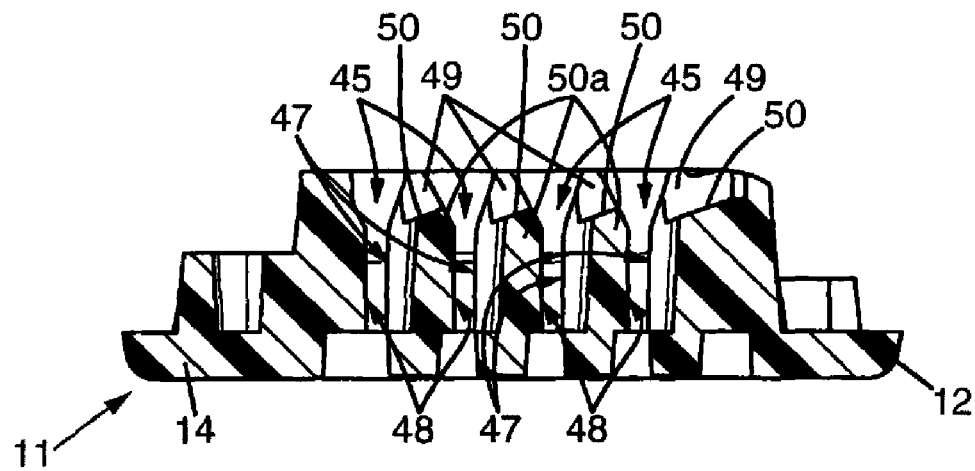
FIGS. 14 and 15 are respectively cross sections along lines XIV-XIV and XV-XV of FIG. 13, showing the platform member without any blade member.
Figure 15:
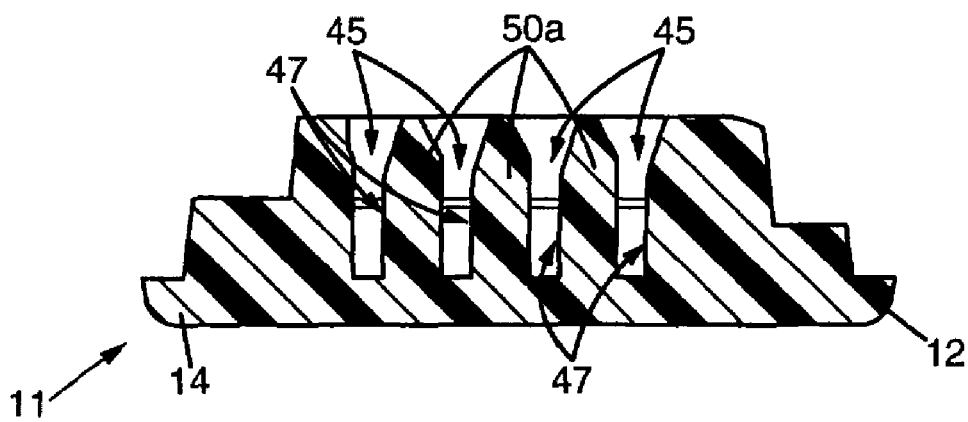
Figure 16:
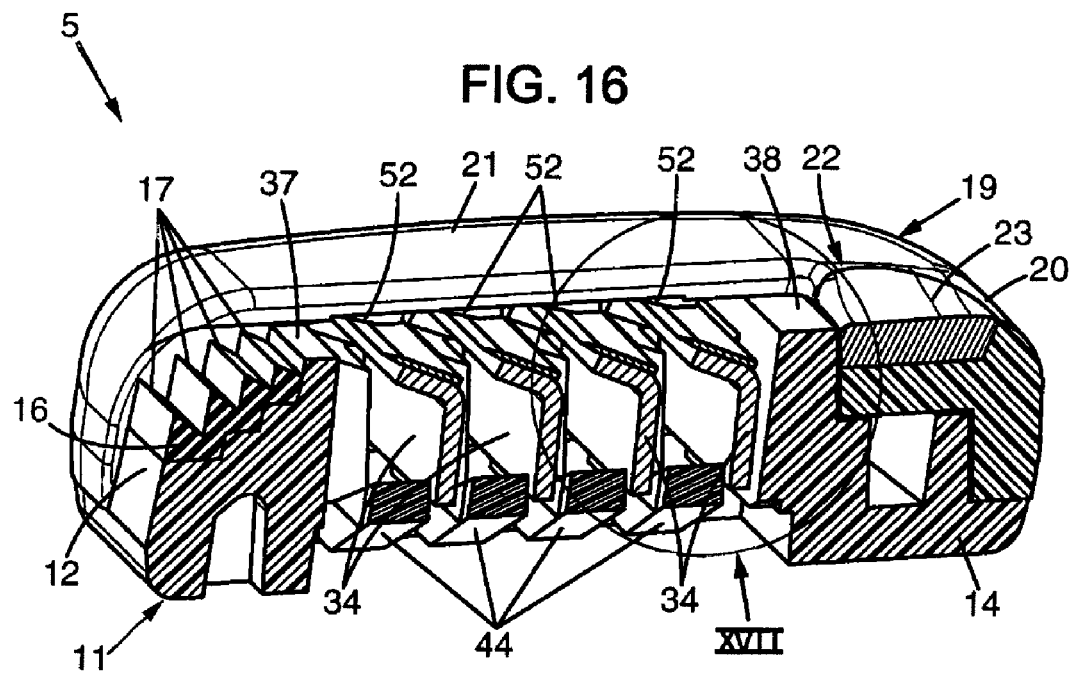
FIG. 16 is a cross section of the complete blade unit, in perspective, the cross section being taken along line XVI-XVI of FIG. 11.
Figure 17:
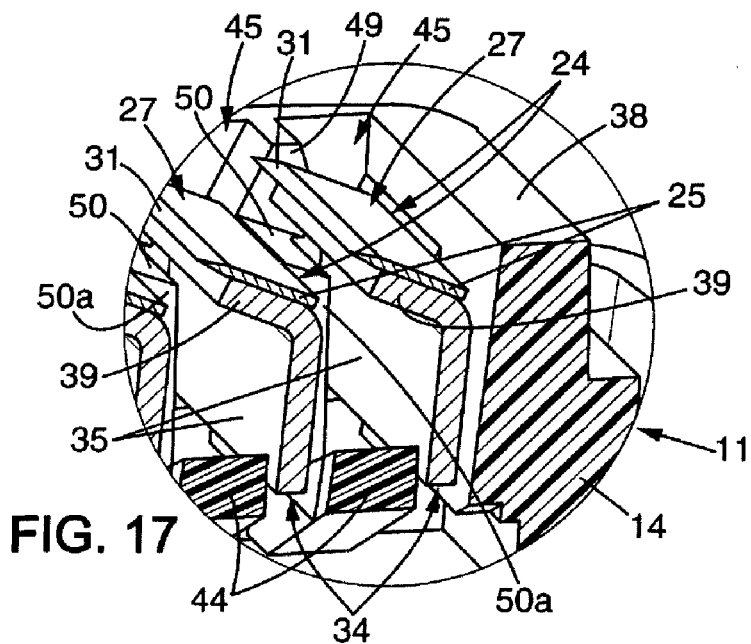
FIG. 17 is an enlarged view of detail XVII of FIG. 16, without the cover.

Besides, as shown in FIGS. 2, 11 and 13, the end portions 40 of the bent supports are slidingly mounted in vertical slots 45 (i.e. slots which are substantially perpendicular to the reference plane P) provided in the inner face of each side member 15 of the platform.

Each vertical slot 45 of the platform is defined between a front guide surface 47 and a back guide surface 48 belonging to the corresponding side member 15 of the platform. The front and back guide surfaces are latterly offset with regard to one another parallel to axis X. The front guide surface 47 may be latterly offset from the blade 25, said front guide surface 47 being closer to the side member 15 than the back guide surface 48.

Besides each front guide surface 47, the side member 15 of the platform preferably includes a lower stop portion 50 which forms an oriented flat surface situated beneath the upper portion 39 of the blade support 34 and which extends parallel to said upper portion 39. Each lower stop portion 50 is designed to limit the downward sliding of the corresponding blade member 34 under forces encountered during shaving.

Further, for each blade member 24, each side member 15 of the platform preferably includes two lateral guide surfaces 49 respectively facing the rounded protrusions 42 of the corresponding blade member, said protrusions 42 being in sliding engagements with the corresponding lateral guide surfaces 49. The lateral guide surfaces 49 may be sloping toward each other, for instance with a small sloping angle comprised between 2 and 5 degrees with regard to a direction perpendicular to reference plane P.

In the example shown in the drawings, the vertical slots 45 are separated from each other by partitions 50a which are molded as a single piece with platform 11 and which include each:
the front guide surface 47, the lateral guide surface 49 and the lower stop portion 50 of the slot situated rear of the partition 50a,
and the back guide surface 48 of the slot situated forward of the partition 50a.

As shown on FIGS. 16-19, the blade members 24 are elastically biased by the elastical arms 44 toward a rest position. In this rest position, the upper faces 27 of the blades, at each lateral end of the blades, bear against corresponding upper stop portions 52 which are provided on the underside 51 of each side member 21 of the cover, said side member 21 covering the slots 45.

More precisely, in the example shown in the drawings, the upper facets 31 of each blade bear against the upper stop portions 52, and said upper stop portions 52 are parallel to said upper facets 31.

Based on this disposition, the cutting edges 26 of the blades 25 do not cut the plastic material of the side members 21, and the blades 25 are not damaged by said side portions 21 of the cover.

Therefore, the rest position of the blade members 24 is well defined, therefore enabling a high shaving precision.

In particular, the maximum exposure EXP of each blade 25, i.e. the distance separating the cutting edge 26 of the blade from the reference plane P (see FIG. 4), measured perpendicularly to reference plane P, is precisely defined. In the example shown in the drawings, this maximum exposure EXP may be around +0.02 mm.

Besides, as shown in FIG. 3, when the blades 24 are in the rest position, the distance SP1 between the rear portion 37 of the guard and the cutting edge 26 of the first blade in the direction of shaving may be around 0.66 mm, whereas the spans SP2, SP3, SP4 between the cutting edges of the four blades may be around 1.48 mm (these distances SP1-SP4 are measured parallel to the reference plane P and perpendicularly to pivot axis X).

We claim:

1. A razor blade unit including a frame and at least one blade movably mounted in the frame, the at least one blade including an upper face, a lower face and a cutting edge, the frame including at least one upper stop portion and the at least one blade being elastically biased toward the at least one upper stop portion, where the at least one blade is in a rest position,
    wherein the at least one upper stop portion includes a bottom surface with at least one oblique surface, and
    wherein the upper face of the at least one blade bears against the at least one oblique surface when the at least one blade is in the rest position, and the upper face being substantially parallel to the at least one oblique surface.

2. The razor blade unit according to claim 1, wherein the at least one blade is movable under forces encountered during shaving and the rest position is a position of maximum exposure of the at least one blade.

3. The razor blade unit according to claim 1, wherein the frame includes at least one elastic finger elastically biasing the at least one blade toward the rest position.

4. The razor blade unit according to claim 1, wherein the frame is made of synthetic material.

5. The razor blade unit according to claim 1, wherein the frame is deprived of metal.

6. The razor blade unit according to claim 1, wherein the upper and lower faces of the at least one blade each include a main surface and a tapered facet, wherein the main surfaces are parallel to each other and the facets taper toward the cutting edge, the tapered facet of the upper face bearing against the at least one oblique surface in the rest position.

7. A safety razor including a handle and a razor blade unit as claimed in claim 1, mounted on the handle.

8. The razor blade unit according to claim 1, wherein the frame includes a guard, a cap and two frame side portions joining the guard to the cap, the at least one blade extending parallel to the guard and the cap between two lateral ends which are near the two frame side portions,
    wherein the at least one upper stop portion having a bottom surface with at least one oblique surface is at least two upper stop portions each having a bottom surface with at least one oblique surface
    wherein each of the two upper stop portions is arranged respectively in each of the frame side portions.

9. The razor blade unit according to claim 8, wherein the at least one blade comprises a plurality of parallel blades, each of the plurality of parallel blades extending parallel to the guard and the cap between two lateral ends, each of the plurality of parallel blades having an upper face, wherein the at least one oblique surface comprises a plurality of oblique surfaces, wherein the at least two upper stop portions comprises a plurality of two upper stop portions corresponding to each of the plurality of parallel blades,
    wherein each of the two frame side portions include respectively one of the two upper stop portions for each of the plurality of parallel blades, wherein each of the two lateral ends of each of the plurality of parallel blades bear in the rest position against a corresponding one of the plurality of oblique surfaces,
    wherein the upper face of each of the plurality of parallel blades is substantially parallel to the corresponding one of the plurality of oblique surface.

10. The razor blade unit according to claim 8, wherein the at least one blade is borne by a bent support which is slidingly mounted in at least two slots which are provided in the two frame side portions of the frame.

11. The razor blade unit according to claim 10, wherein the bent support includes a lower portion extending in a plane parallel to the slots and an upper portion extending in a plane parallel to the at least one blade, the lower portion extending parallel to the cutting edge between two lateral portions which are slidingly mounted in the slots.

12. The razor blade unit according to claim 11, wherein each of the slots of the frame is defined between a front guide surface and a back guide surface belonging to a corresponding one of the frame side portions, the front guide surface being closer to the guard and the back guide surface being closer to the cap, and the front and back guide surfaces being laterally offset with regard to one another parallel to the cutting edge of the at least one blade.

13. The razor blade unit according to claim 12, wherein each of the two lateral portions of the lower portion of the bent support has a side edge, wherein the front guide surface of the slot is closer to the side edge than the back guide surface of the slot.

14. The razor blade unit according to claim 12, wherein each of the frame side portions of the frame further includes a lower stop portion which is near the front guide surface and which is disposed under the upper portion of the bent support to limit sliding of the at least one blade and bent support away from the rest position.

15. The razor blade unit according to claim 14, wherein the lower stop portion is substantially parallel to the upper portion of the bent support.

16. The razor blade unit according to claim 14, wherein each of the two lateral portions of the lower portion of the bent support has a side edge and each of the two lateral portions of the lower portion of the bent support protrude laterally with regard to the upper portion and with regard to the at least one blade, each of the lower stop portions is offset laterally from the front guide surface, away from a corresponding one of the side edges of the lower portion of the bent support.

17. The razor blade unit according to claim 11, wherein the upper portion of the bent support extends parallel to the cutting edge between two lateral edges, and each of the frame side portions of the frame include two lateral guide surfaces respectively facing the lateral edges of the upper portion of the bent support.

18. The razor blade unit according to claim 17, wherein each of the lateral edge of the upper portion of the bent support has a rounded protrusion which protrudes laterally from the corresponding lateral end of the at least one blade, the rounded protrusion being in sliding engagement with the corresponding lateral guide surface.

19. The razor blade unit according to claim 18, wherein the bent support is a bent metal sheet part having a cutout portion having lateral wings which constitute the rounded protrusions, the lateral wings having rounded ends.

20. The razor blade unit according to claim 17,
wherein the least one least one blade comprises a plurality of parallel blades,
wherein the at least two slots comprises a plurality of slots,
wherein each of the plurality of slots of the frame is defined between a front guide surface and a back guide surface belonging to a corresponding one of the frame side portions of the frame, the front guide surface being closer to the guard and the back guide surface being closer to the cap, and the front and back guide surfaces being laterally offset with regard to one another parallel to the cutting edge of the plurality of parallel blades,
wherein each of the two frame side portions of the frame further includes a lower stop portion which is near the front guide surface and which is disposed under the upper portion of the bent support to limit sliding of each of the plurality blades and bent support away from the rest position,
and wherein each of the two frame side portions include at least two adjacent slots among the plurality of slots, adjacent to one another, separated by a partition, the partition including the front guide surface, the lower stop portion and the lateral guide surface of a first one of the at least adjacent two slots, and the back guide surface of a second one of the at least two adjacent slots.

* * * * *